(12) United States Patent
Zhou et al.

(10) Patent No.: US 11,671,977 B2
(45) Date of Patent: Jun. 6, 2023

(54) ENHANCED GROUP-CC BASED PDSCH AND PDCCH BEAM UPDATE

(71) Applicant: QUALCOMM Incorporated, San Diego, CA (US)

(72) Inventors: Yan Zhou, San Diego, CA (US); Mostafa Khoshnevisan, San Diego, CA (US); Xiaoxia Zhang, San Diego, CA (US); Tao Luo, San Diego, CA (US); Hamed Pezeshki, San Diego, CA (US); Arumugam Chendamarai Kannan, San Diego, CA (US); Jing Sun, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/091,866

(22) Filed: Nov. 6, 2020

(65) Prior Publication Data
US 2021/0144744 A1    May 13, 2021

Related U.S. Application Data

(60) Provisional application No. 62/933,323, filed on Nov. 8, 2019.

(51) Int. Cl.
*H04W 72/04* (2009.01)
*H04W 72/12* (2009.01)
*H04W 72/23* (2023.01)
*H04W 72/0453* (2023.01)

(52) U.S. Cl.
CPC ........ *H04W 72/23* (2023.01); *H04W 72/0453* (2013.01)

(58) Field of Classification Search
CPC ..................... H04W 72/1289; H04W 72/0453
See application file for complete search history.

(56) References Cited

U.S. PATENT DOCUMENTS

| | | | |
|---|---|---|---|
| 2019/0045533 A1* | 2/2019 | Chatterjee | H04L 5/001 |
| 2019/0174466 A1* | 6/2019 | Zhang | H04L 5/005 |
| 2019/0281587 A1* | 9/2019 | Zhang | H04W 72/042 |
| 2021/0014931 A1* | 1/2021 | Noh | H04W 8/24 |
| 2021/0385832 A1* | 12/2021 | Zhang | H04B 7/0408 |
| 2021/0410170 A1* | 12/2021 | Matsumura | H04W 72/1289 |

OTHER PUBLICATIONS

Huawei, et al., "Feature Summary of Enhancements on Multi-TRP/Panel Transmission", 3GPP Draft, 3GPP TSG RAN WG1 Meeting #98bis, R1-1911425, FL Summary MTRP 98BIS V2, 3rd Generation Partnership Project (3GPP), Mobile Competence Centre; 650, Route Des Lucioles; F-06921 Sophia-Antipolis Cedex, France, vol. RAN WG1, No. Chongqing. China, Oct. 14, 2019-Oct. 20, 2019, Oct. 22, 2019 (Oct. 22, 2019), XP051798694, 101 Pages.
International Search Report and Written Opinion—PCT/US2020/059572—ISA/EPO—dated May 27, 2021.

(Continued)

*Primary Examiner* — Kent Krueger
(74) *Attorney, Agent, or Firm* — Patterson + Sheridan, L.L.P.

(57) ABSTRACT

Certain aspects of the present disclosure relate to methods and apparatus for indicating transmission configuration indication (TCI) states for multiple component carriers (CCs).

30 Claims, 14 Drawing Sheets

(56) References Cited

OTHER PUBLICATIONS

ZTE: "Further Details on Multi-Beam/TRP Operation", 3GPP TSG-RAN WG1 Meeting #98bis, 3GPP Draft; R1-1910287 Further Details on Multi-Beam and TRP Operation, 3rd Generation Partnership Project (3GPP), Mobile Competence Centre; 650, Route Deslucioles; F-06921 Sophia-Antipolis Cedex, vol. RAN WG1, No. Chongqing, China; Oct. 14, 2019-Oct. 20, 2019, Oct. 5, 2019 (Oct. 5, 2019), 16 Pages, XP051808481.

3GPP TSG-RAN WG1: "LS on Simultaneous TCI State Activation and Spatial Relation Update Across Multiple CCs/BWPs by MAC-CE", 3GPP Draft, R2-1914308, 3GPP TSG RAN WG2 #108, 3rd Generation Partnership Project (3GPP), Mobile Competence Centre, 650, Route Des Lucioles, F-06921 Sophia-Antipolis Cedex, France, vol. RAN, from the Internet: URL:https://ftp.3gpp.org/tsg_ran/WG2_RL2/SGR2_108/Docs/R2-1914308.zip, R2-1914308_R1-1911617.docx [retrieved on Nov. 6, 2019] p. 2, 3 Pages.

Huawei, et al., "MAC CE Signalling Enhancement for TCI Indication of Single-PDCCH Based Multi-TRP Transmission", 3GPP Draft, R2-1914674, 3GPP TSG-RAN WG2 Meeting#108, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 7, 2019 (Nov. 7, 2019), XP051815726, 5 Pages, Retrieved from the Internet: URL:https://ftp.3gpp.org/tsg_ran/WG2_RL2/TSGR2_108/Docs/R2-1914674.zip, R2-1914674.docx [retrieved on Nov. 7, 2019] the Whole Document.

Mediatek Inc: "MAC CE Format for Single PDCCH Multi-TRP", 3GPP Draft, R2-1913239, 3GPP TSG-RAN WG2 Meeting#107Bis, MAC CE Format for Single PDCCH Multi-TRP, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051804924, 6 Pages, Retrieved from the Internet: URL:https://ftp.3gpp.org/tsg_ran/WG2_RL2/TSGR2_107bis/Docs/R2-1913239.zip, R2-1913239 MAC CE Format for Single PDCCH Multi-TRP.docx [retrieved on Oct. 4, 2019] Sections 1-2.

Partial International Search Report—PCT/US2020/059572—ISA/EPO—dated Feb. 22, 2021.

QUALCOMM Incorporated: "Enhanced TCI States Activation/Deactivation PDSCH MAC CE for Multi-TRP", 3GPP Draft, 3GPP TSG-RAN WG2 Meeting #107bis, R2-1913407_Enhanced TCI States Activation_Deactivation PDSCH MAC CE for Multi-TRP, 3rd Generation Partnership Project (3GPP), Mobile Competence Centre, 650, Route Des Lucioles, F-06921, S, vol. RAN WG2, No. Chongqing, China, Oct. 14, 2019-Oct. 18, 2019, Oct. 4, 2019 (Oct. 4, 2019), XP051804984, pp. 1-3, Retrieved from the Internet: URL:https://ftp.3gpp.org/tsg_ran/WG2_RL2/TSGR2_107bis/Docs/R2-1913407.zip, R2-1913407_Enhanced TCI States Activation_Deactivation PDSCH MAC CE for Multi-TRP.docx [retrieved on Oct. 4, 2019] the Whole Document.

\* cited by examiner

```
TCI-State ::=         SEQUENCE {
    tci - StateId         TCI - StateId,
    qcl - Type1           QCL - Info,
    qcl - Type2           QCL - Info                    OPTIONAL, - -
Need R
    nrofPTRS - Ports      ENUMERATED {n1, n2}
    OPTIONAL, - - Need R
    ...
}
QCL - Info ::=        SEQUENCE {
    cell                  ServCellIndex                 OPTIONAL, - -
Need R
    bwp - Id              BWP - Id                      OPTIONAL, - -
Cond CSI - RS - Indicated
    referenceSignal       CHOICE {
        csi - rs              NZP - CSI - RS - ResourceId,
        ssb                   SSB - Index,
        csi - RS - for - tracking   NZP - CSI - RS - ResrouceSetId
    },
    qcl - Type            ENUMERATED {typeA, typeB, typeC, typeD},
```

FIG. 7

ENHANCED GROUP-CC BASED PDSCH AND PDCCH BEAM UPDATE

CROSS-REFERENCE TO RELATED APPLICATIONS

This application claims benefit of and priority to U.S. Provisional Patent Application No. 62/933,323, filed Nov. 8, 2019, which is assigned to the assignee hereof and herein incorporated by reference in its entirety as if fully set forth below and for all applicable purposes.

FIELD

The present disclosure relates generally to communication systems, and more particularly, to methods and apparatus for indicating transmission configuration indication (TCI) states for multiple component carriers (CCs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment. The method generally includes receiving a downlink control information (DCI) scheduling a physical downlink shared channel (PDSCH) with a transmission configuration indicator (TCI) code point value, determining, based on the code point value, at least two activated PDSCH TCI state IDs for at least two sets of frequency resources, and processing the PDSCH according to the indicated TCI state IDs.

Certain aspects provide a method for wireless communications by a network entity. The method generally includes determining a code point value associated with at least two activated PDSCH TCI state IDs for at least two sets of frequency resources and sending a downlink control information (DCI) scheduling a physical downlink shared channel (PDSCH) with a transmission configuration indicator (TCI) code point value.

Certain aspects provide a method for wireless communications by a user equipment. The method generally includes receiving a medium access control (MAC) control element (MAC CE) that activates at least one physical downlink control channel (PDCCH) TCI state ID for multiple control resource set (CORESET) IDs and monitoring for PDCCH transmissions in the CORESET IDs according to the activated TCI state ID.

Certain aspects provide a method for wireless communications by a network entity. The method generally includes transmitting a medium access control (MAC) control element (MAC CE) that activates at least one physical downlink control channel (PDCCH) TCI state ID for multiple control resource set (CORESET) IDs and sending at least one PDCCH in the CORESET IDs according to the activated TCI state ID.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example of transmission configuration indicator (TCI) state information used to signal quasi-colocation (QCL) information.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
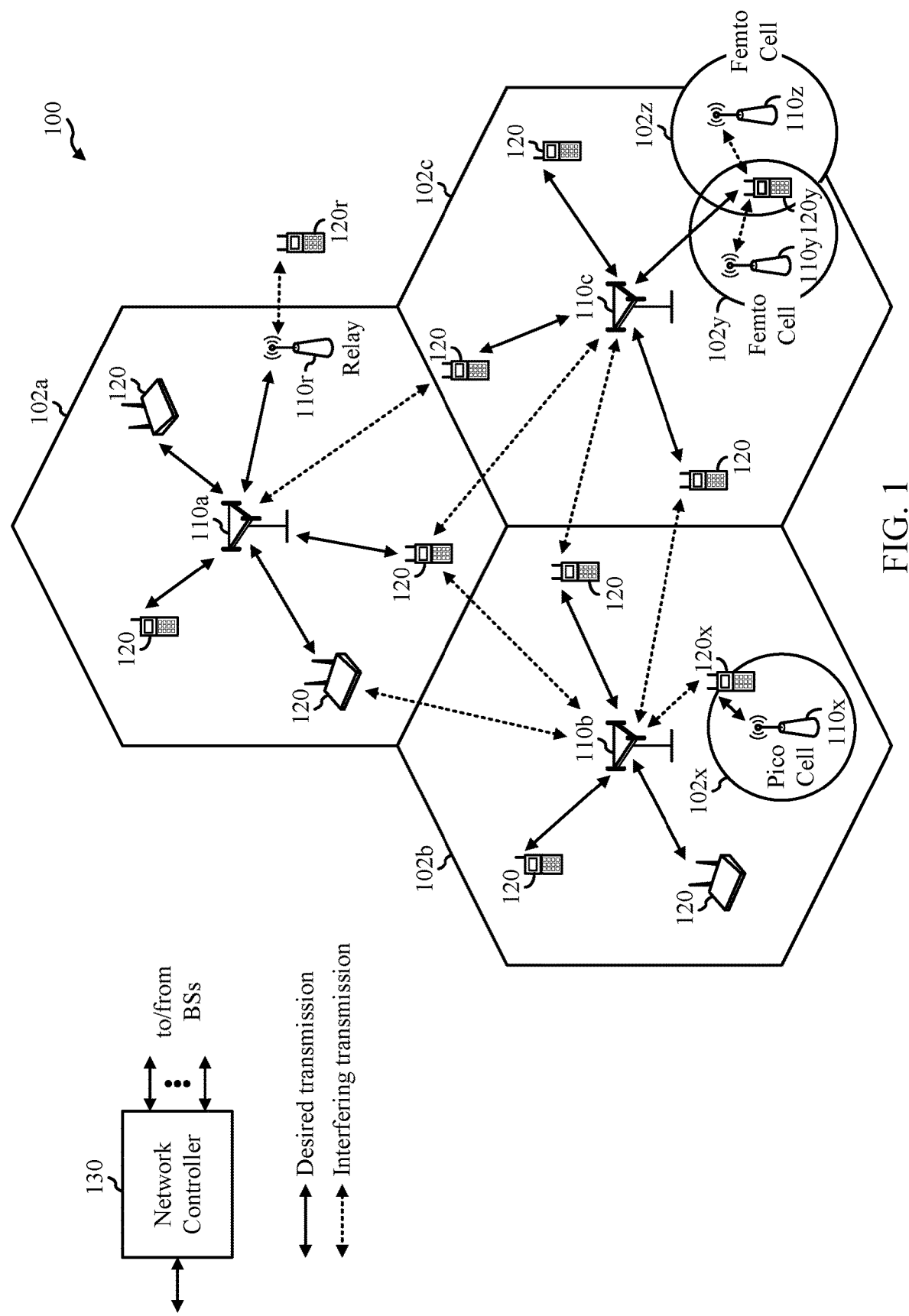
FIG. 1 is a block diagram conceptually illustrating an example telecommunications system, in which aspects of the present disclosure may be performed.

Aspects of the disclosure provide mechanisms for indicating transmission configuration indication (TCI) states for multiple component carriers (CCs). The mechanisms may be applied for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, the network 100 may include one or more UEs 120 configured to perform operations 1100 of FIG. 11 and/or operations 1300 of FIG. 13. Similarly, the network 100 may include one or more base stations 110 configured to perform operations 1200 of FIG. 12 and/or operations 1400 of FIG. 14.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length (period) of 10 ms. Consequently, each subframe may have a length of 0.2 ms. In some cases, subframes may have a length (duration) of 1 ms and each subframe may be further divided into two slots of 0.5 ms each (e.g., with each slot containing 6 or 7 OFDM symbols depending on cyclic prefix (CP) length. A slot may be further divided into mini-slots, each mini-slot having a smaller duration (e.g., containing fewer symbols than a full slot). Each subframe may indicate a link direction (e.g., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple B Ss. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
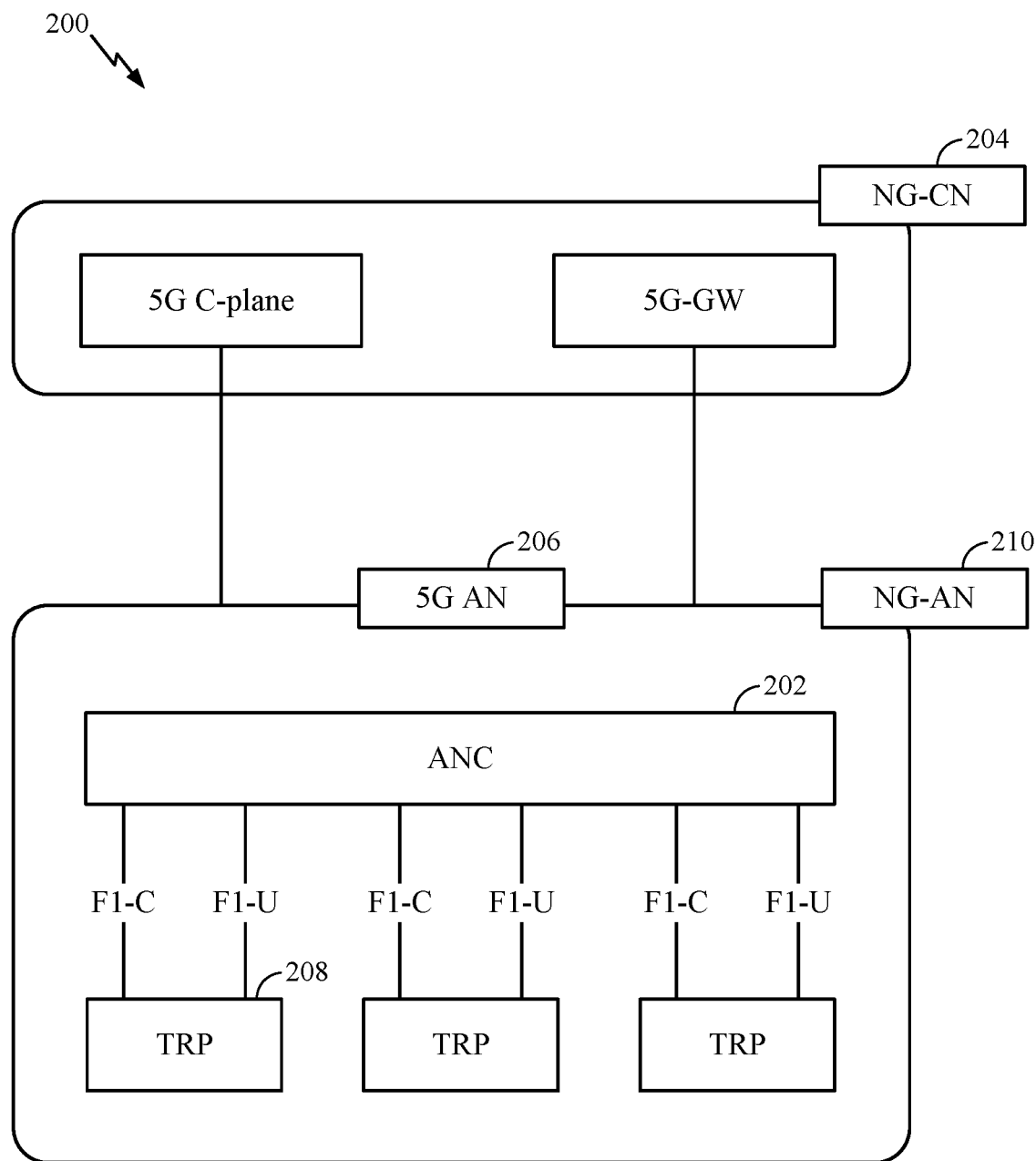
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
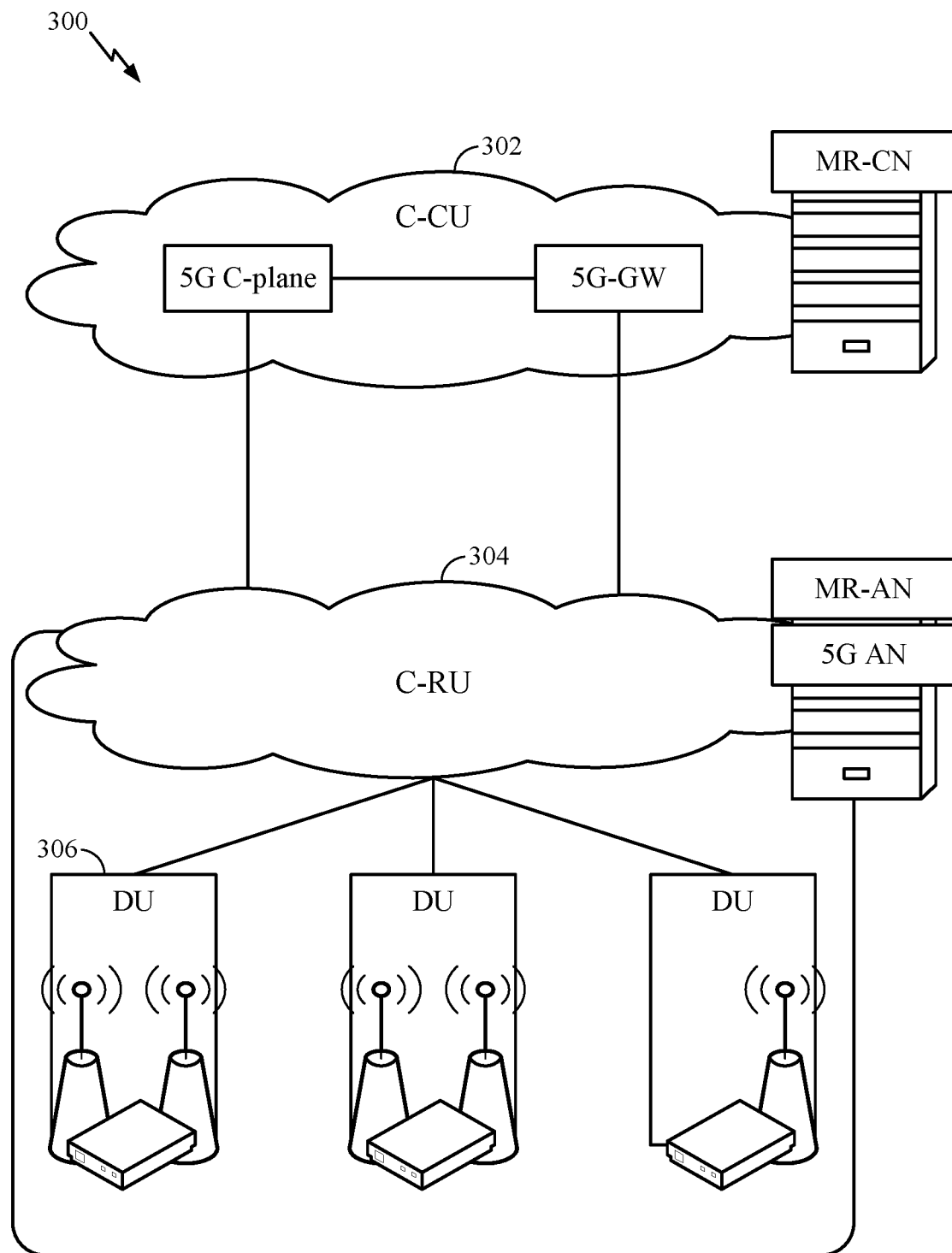
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions.

Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
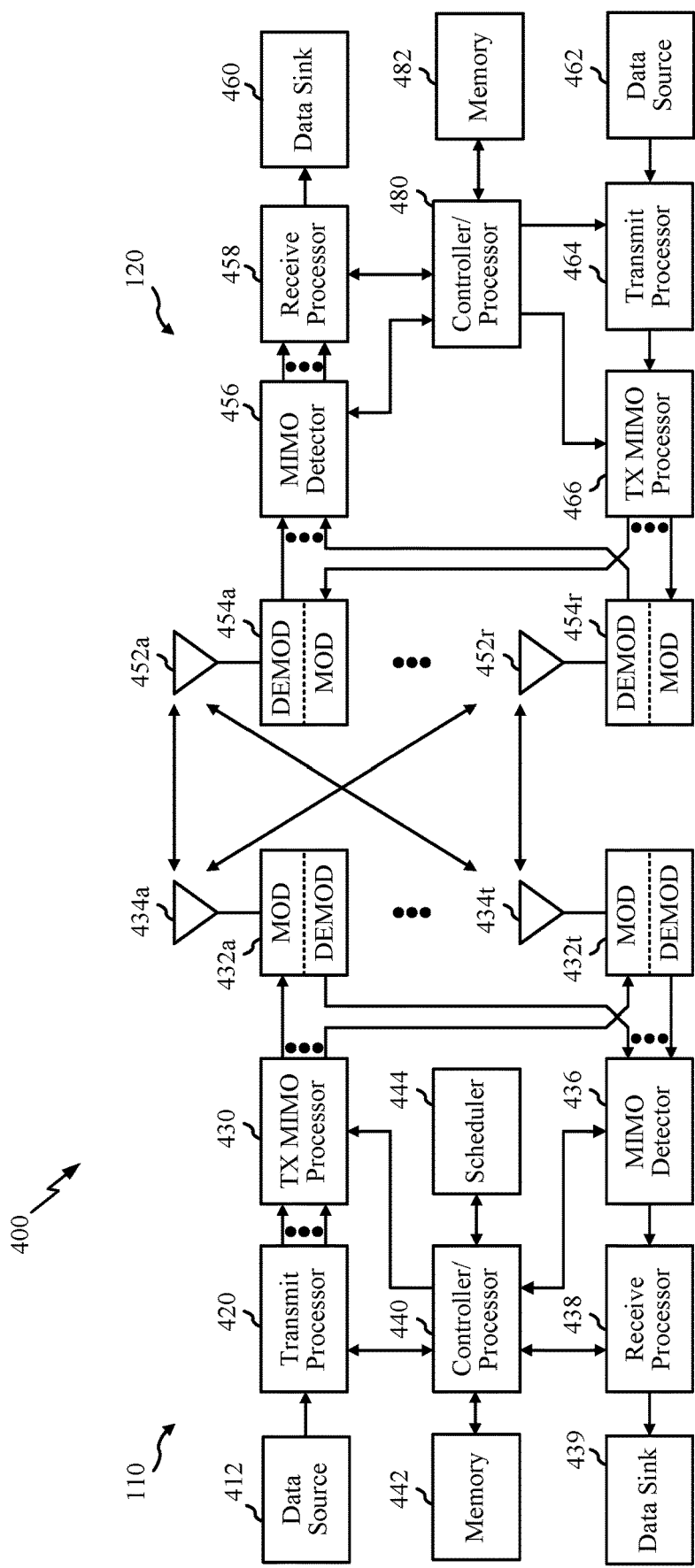
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 (used to implement transceiver or separate receiver and transmitter chain functions) of the UE 120 may be used to perform operations 1100 of FIG. 11 and/or operations 1300 of FIG. 13. Similarly, antennas 434, processors 430, 420, 438, and/or controller/processor 440 of the BS 110 may be used to perform operations 1200 of FIG. 12 and/or operations 1400 of FIG. 14.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. As noted above, the processor 440 and/or other processors and modules at the base station 110 may perform or direct the processes for the techniques described herein with reference to FIG. 10. The processor 480 and/or other processors and modules at the UE 120 may also perform or direct processes for the techniques described herein with reference to FIG. 9. The memories 442 and 482 may store data and program codes for the BS 110 and the UE 120, respectively. A scheduler 444 may schedule UEs for data transmission on the downlink and/or uplink.

Figure 5:
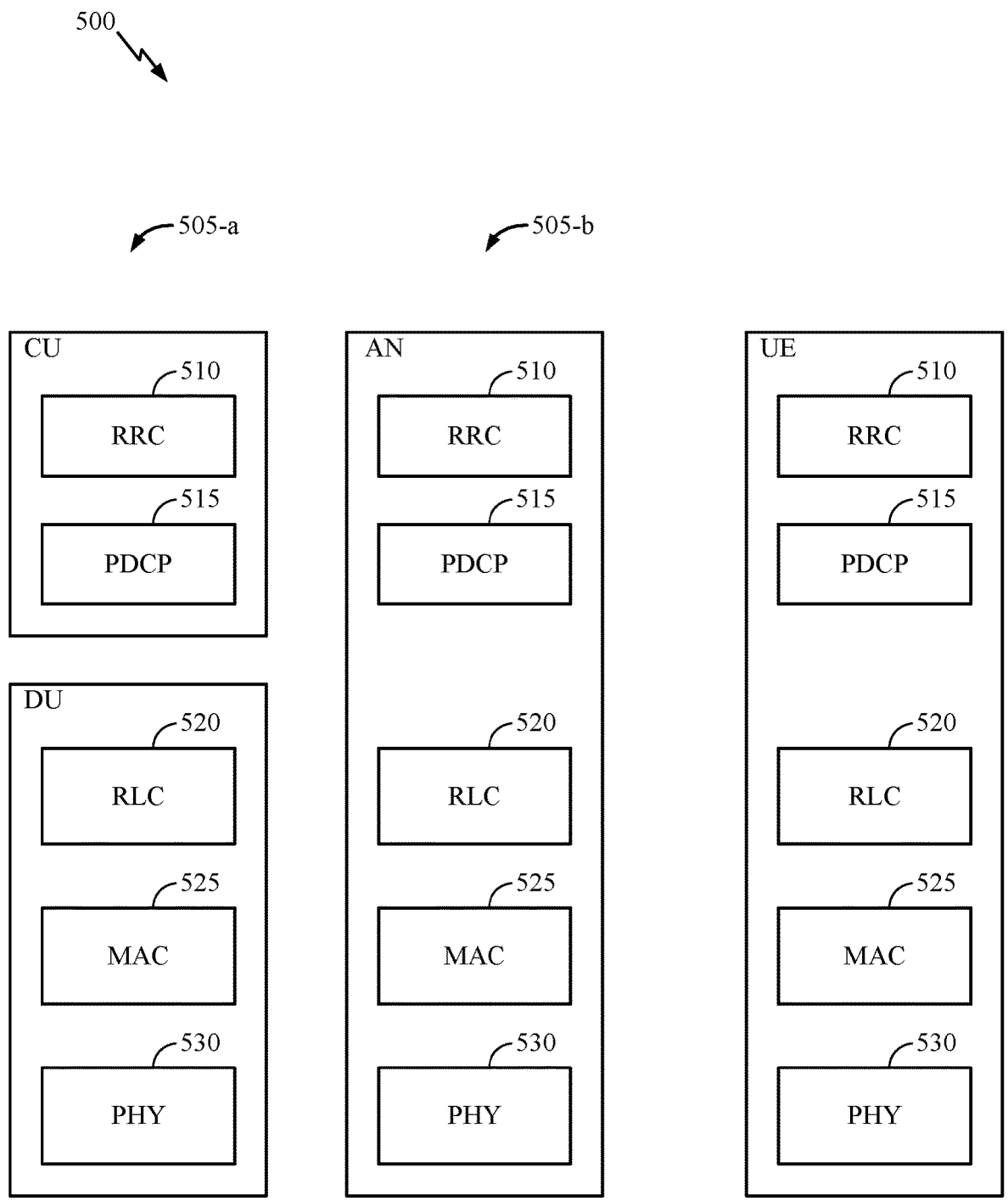
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
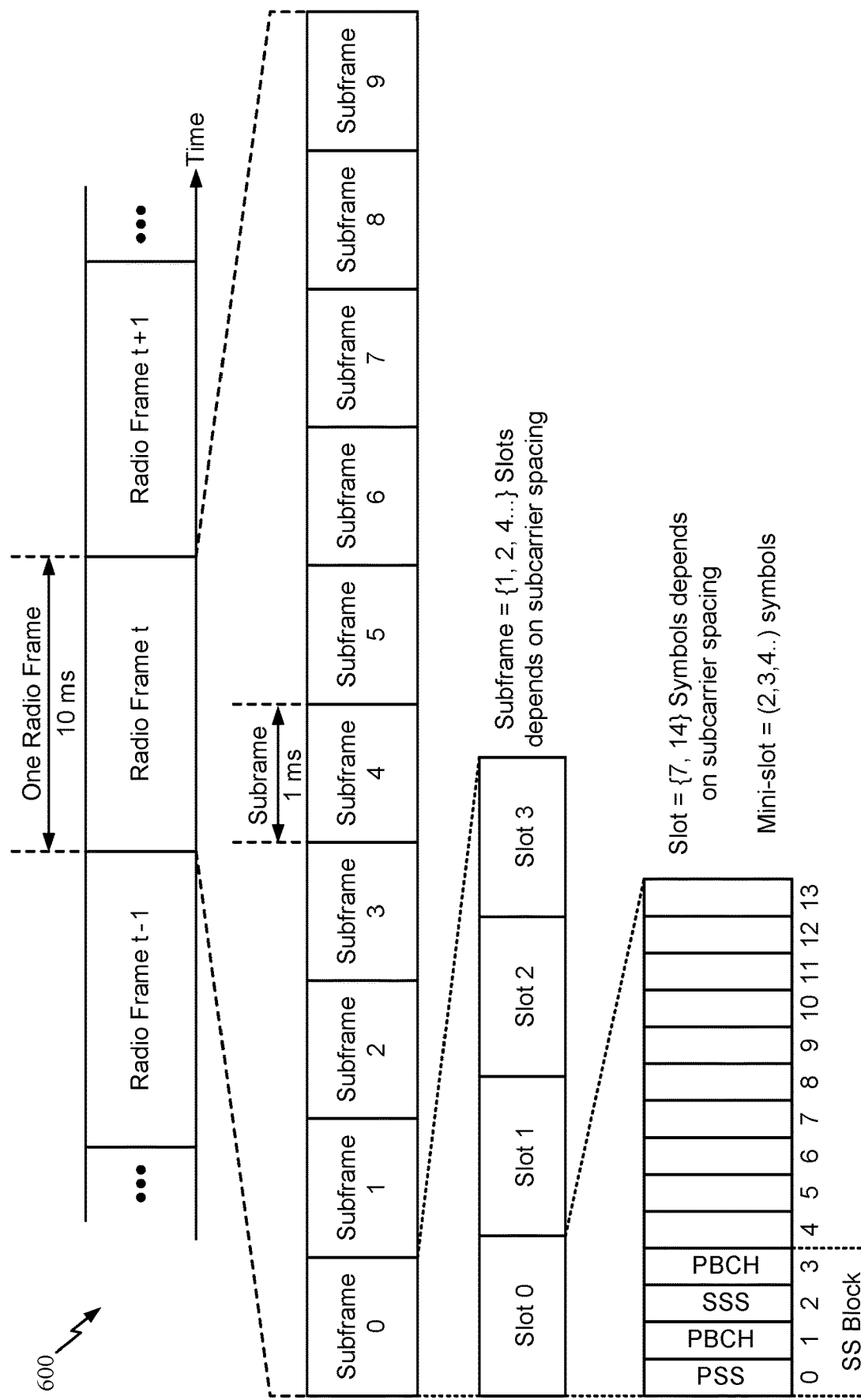
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example QCL Signaling

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. For example, a particular TCI state may be indicated by an N bit DCI field for a PDSCH. Each configured TCI state may include one RS set TCI-RS-SetConfig that indicates different QCL assumptions between certain source and target signals.

In certain deployments, techniques are used to provide quasi-colocation (QCL) signaling for reference signals (RS) and channels across scenarios involving multiple cells, such as coordinated multipoint (CoMP) scenarios in which multiple transmit receive points (TRPs) or integrated access and backhaul (IAB) nodes each have their own cell ID.

FIG. 7 illustrates an example of how RSs associated with TCI states may be configured via radio resource control (RRC) signaling. QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

As illustrated in FIG. 7, the TCI states may indicate which RS are QCL'd and the QCL type. The TCI state may also indicate a ServCellIndex that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

Figure 8:
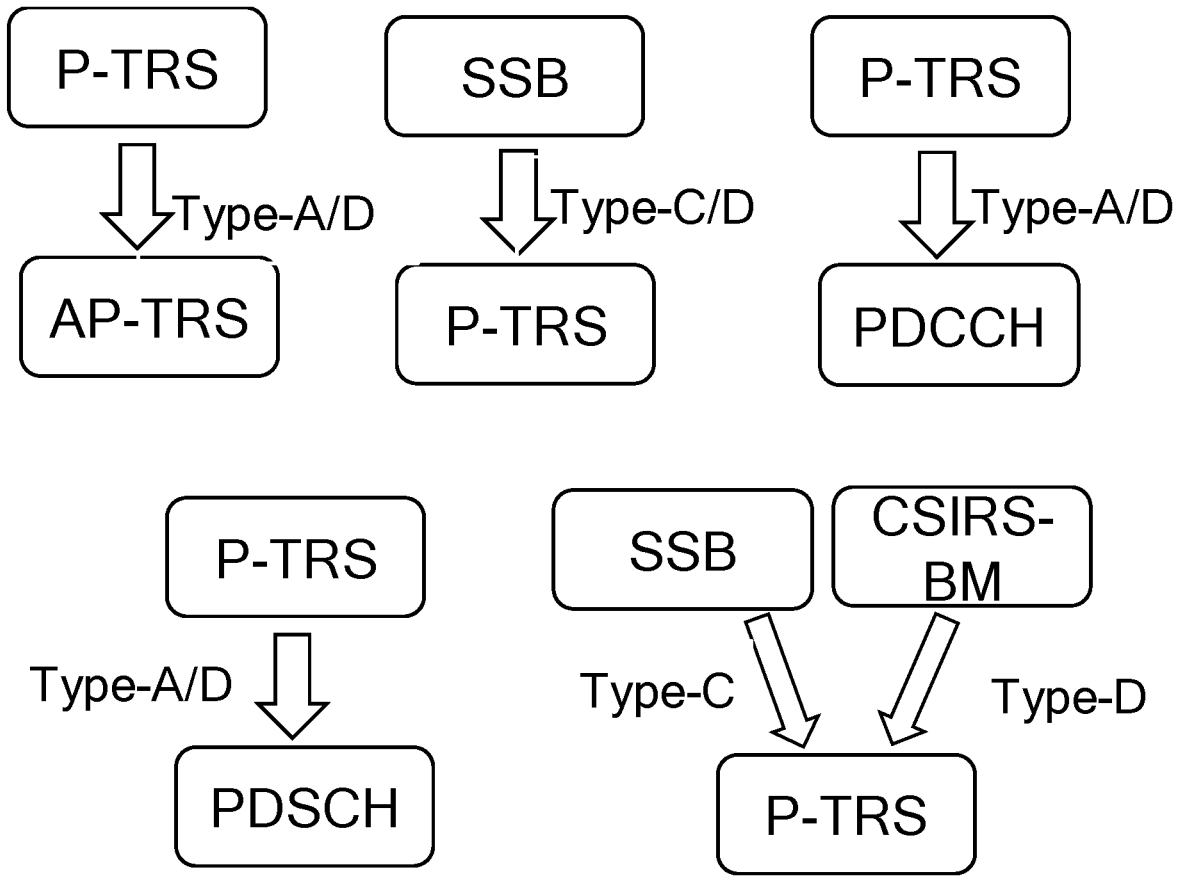
FIG. 8 graphically illustrates example QCL relationships between source and target reference signals.

FIG. 8 illustrate examples of the association of DL reference signals with corresponding QCL types that may be indicated by a TCI-RS-SetConfig.

In the examples of FIG. 8, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 8, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

Figure 9:
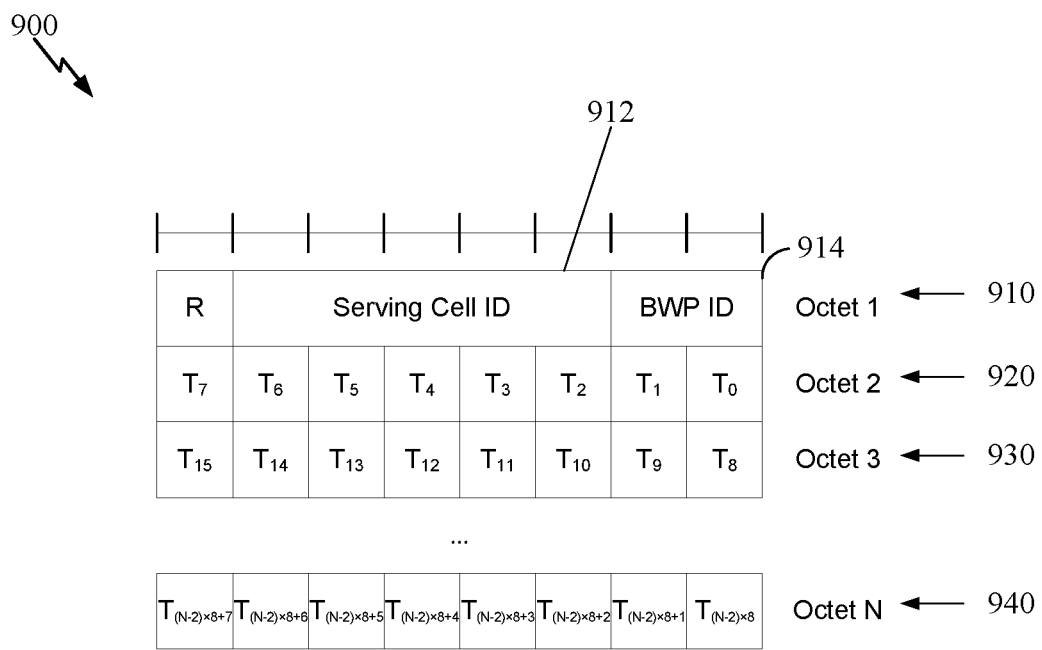
FIG. 9 illustrates an exemplary medium access control (MAC) control element (CE) for activating or deactivating TCI-states for a UE-specific physical channel, according to previously known techniques.

FIG. 9 illustrates an exemplary medium access control (MAC) control element (CE) 900 for activating or deactivating TCI-states for a UE-specific physical downlink shared channel (PDSCH), according to previously known techniques (e.g., Rel-15). The exemplary MAC CE includes a plurality of octets 910, 920, 930, 940, etc. The first octet 910 includes a Serving Cell ID field 912, which is five bits long and indicates the identity of the serving cell for which the MAC CE applies. The first octet also includes a BWP ID field 914 that is two bits long and indicates a downlink (DL) bandwidth part (BWP) for which the MAC CE applies as the code point of the downlink control information (DCI) bandwidth part indicator field as specified in TS 38.212 (available from the 3GPP website and other sources). The second octet 920 and later octets include bits indicating TCI states for the serving cell ID and BWP ID. For each if there is a TCI state with TCI-StateId i as specified in TS 38.331 (also available from 3GPP), then the corresponding $T_i$ field indicates the activation or deactivation status of the TCI state with TCI-StateId otherwise (i.e., there is not a TCI state with TCI-StateID i) the MAC entity ignores the $T_i$ field. The $T_i$ field is set to 1 to indicate that the TCI state with TCI-StateId i is activated and mapped to the code point of the DCI Transmission Configuration Indication field, as specified in TS 38.214 (available from 3GPP). The $T_i$ field is set to 0 to indicate that the TCI state with TCI-StateId i is deactivated and is not mapped to the code point of the DCI Transmission Configuration Indication field. The code point to which the TCI State is mapped is determined by its ordinal position among all the TCI States with $T_i$ field set to 1, i.e. the first TCI State with $T_i$ field set to 1 shall be mapped to the code point value 0, second TCI State with $T_i$ field set to 1 shall be mapped to the code point value 1, and so on. The maximum number of activated TCI states may be 8.

Figure 10:
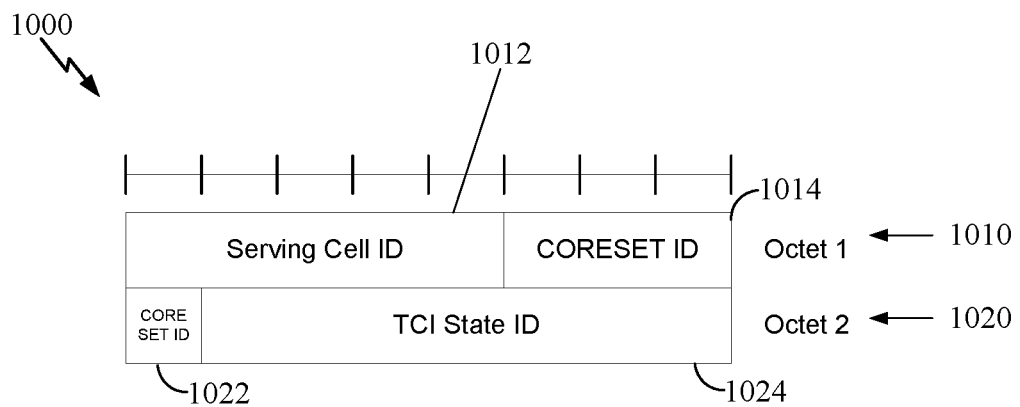
FIG. 10 illustrates an exemplary MAC CE 400 for activating or deactivating a TCI-state for a PDCCH, according to previously known techniques.

FIG. 10 illustrates an exemplary MAC CE 1000 for activating or deactivating a TCI-state for a PDCCH, according to previously known techniques (e.g., Rel-15). The first octet 1010 includes a Serving Cell ID field 1012 that is five bits long and indicates the identity of the serving cell for which the MAC CE applies. The last three bits 1014 and the first bit 1022 of the second octet 1020 make up the CORESET ID field, which is four bits long and indicates a control resource set (CORESET) identified with ControlResourceSetId (e.g., as specified in TS 38.331, available from 3GPP), for which the TCI State is being indicated. If the value of the field is 0, then the field refers to the control resource set configured by controlResourceSetZero (e.g., as specified in TS 38.331). The second octet 1020 includes a TCI State ID field which is seven bits long and indicates the TCI state identified by TCI-StateId (e.g., as specified in TS 38.331) applicable to the control resource set identified by the CORESET ID field. If the value of the CORESET ID field is set to 0, then the TCI State ID field indicates a TCI-StateId for a TCI state of the first 64 TCI-states configured by tci-States-ToAddModList and tci-States-ToReleaseList in the PDSCH-Config in the active BWP. If the value of the CORESET ID field is set to a value other than 0, then the TCI State ID field indicates a TCI-StateId configured by tci-StatesPDCCH-ToAddList and tci-StatesPDCCH-ToReleaseList in the controlResourceSet identified by the indicated CORESET ID.

Example Enhanced Group-CC Based PDSCH & PDCCH Beam Update

Aspects of the disclosure provide mechanisms for indicating transmission configuration indication (TCI) states for multiple component carriers (CCs).

There are various potential issues with conventional DCI based signaling in scenarios involving multiple transmission reception points (TRPs). For example, one potential issue is that (in Rel-16) single DCI based mTRP, the mapping between a PDSCH TCI code point and corresponding activated PDSCH TCI state IDs are indicated by a MAC-CE per CC. In the case of multiple CCs, multiple such MAC-CEs have to be sent, which increases both overhead and latency.

Another potential issues is that (in Rel. 16) for a group-CC PDCCH TCI state activation MAC-CE, each MAC-CE may only indicate activated TCI states for a particular CORESET ID. For multiple CORESET IDs, multiple such MAC-CEs have to be sent which, again, increase both overhead and latency.

Another potential issue is that (in Rel-16) for a group-CC PDCCH TCI state activation MAC-CE, the UE behavior may need to be clarified if an indicated CORESET ID or corresponding activated TCI state ID is not configured on a CC in the indicated CC list.

In some cases, For Group-CC Based PDSCH Beam Update, when a set of TCI-state IDs for PDSCH are activated by a MAC CE for a set of CCs/BWPs at least for the same band, where the applicable list of CCs is indicated by RRC signaling, the same set of TCI-state IDs are applied for the all BWPs in the indicated CCs. In some cases, inter-band CA for this feature may be supported. In some cases, an indication may be provided of the applicable list of bands for the feature of single MAC-CE to activate the same set of PDSCH TCI state IDs for multiple CCs/BWPs. How many combinations of CCs can be configured by RRC may be based on UE capability.

In some cases, for the purpose of simultaneous TCI state activation across multiple CCs/BWPs, up to two lists of CCs can be configured by RRC per UE, and the applied list is determined by the indicated CC in the MAC CE. In such cases, the UE may expect no overlapped CC in multiple RRC-configured lists of CCs.

Aspects of the present disclosure, however, may help address the potential issues discussed above, for example, in mTRP scenarios where PDSCH is scheduled with a single DCI.

Figure 11:
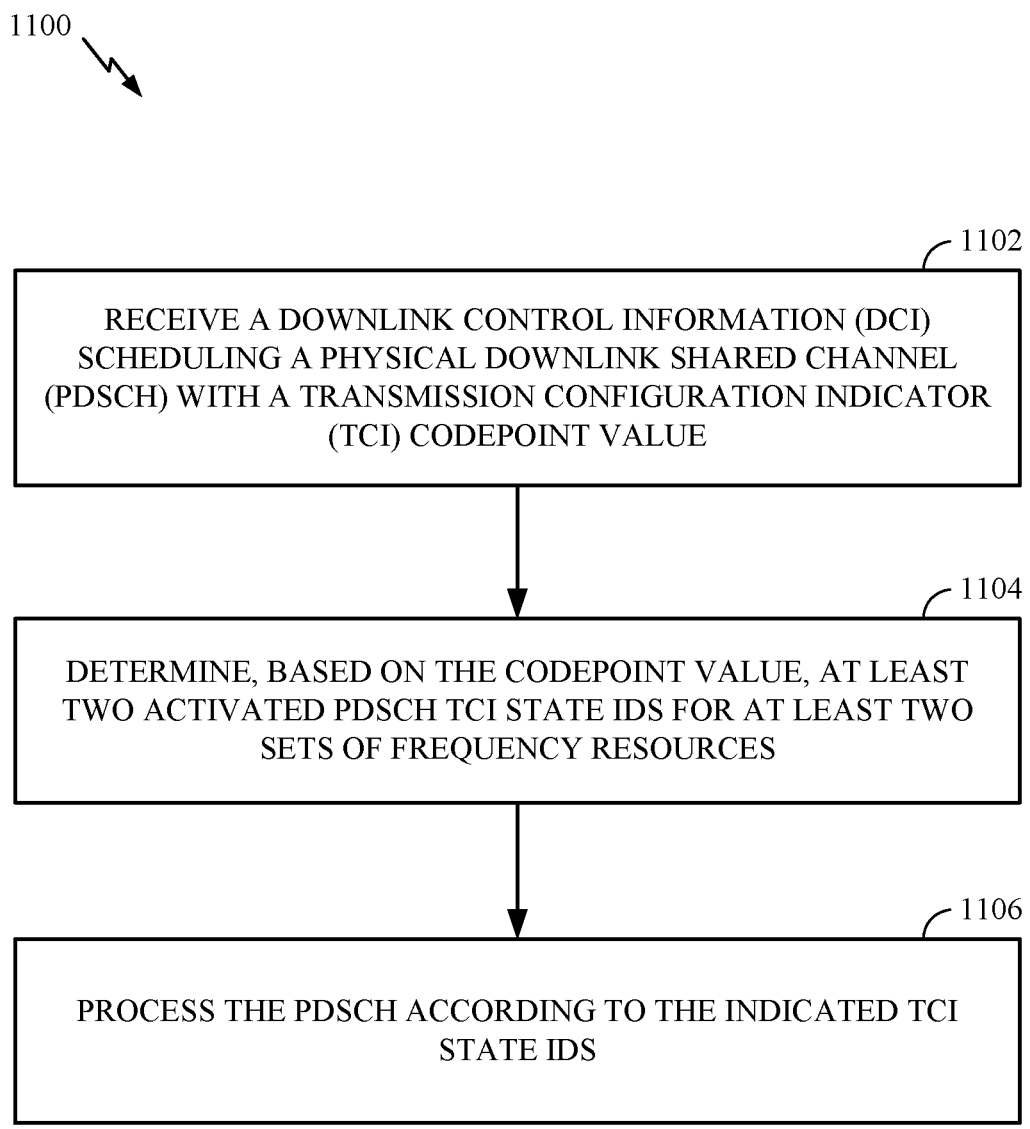
FIG. 11 illustrates example operations for wireless communications by a user equipment (UE), in accordance with aspects of the present disclosure.

FIG. 11 illustrates example operations 1100 for wireless communications by a UE, in accordance with aspects of the present disclosure.

Operations 1100 begin, at 1102, by receiving a downlink control information (DCI) scheduling a physical downlink shared channel (PDSCH) with a transmission configuration indicator (TCI) code point value. In some cases, the DCI includes a single DCI that schedules multiple PDSCHs from multiple transmission reception points.

At 1104, the UE determines, based on the code point value, at least two activated PDSCH TCI state IDs for at least two sets of frequency resources. In some cases, the UE receives a single medium access control (MAC) control element (CE) that activates the at least two PDSCH TCI state IDs. In some cases, the at least two sets of frequency resources include at least one of multiple component carriers (CCs) or multiple bandwidth parts (BWPs). For example, the UE determines the at least two activated PDSCH TCI state IDs based on a mapping of the code point value to TCI state IDs. The UE may receive signaling indicating a list of CCs and the same mapping is applied to all CCs in the list and corresponding BWPs.

In some cases, the list of CCs is indicated via at least one of radio resource control (RRC) signaling, a MAC CE, or DCI. The list of CCs may be configured via RRC signaling and an applicable list can be determined implicitly by an indicated CC in a MAC CE or DCI, or by explicit signaling via an applicable CC list ID in the MAC CE or DCI.

In some cases, the UE receives signaling indicating the mapping via a MAC CE that activates the PDSCH TCI state IDs, or a separate MAC CE.

At 1106, the UE processes the PDSCH according to the indicated TCI state IDs.

Figure 12:
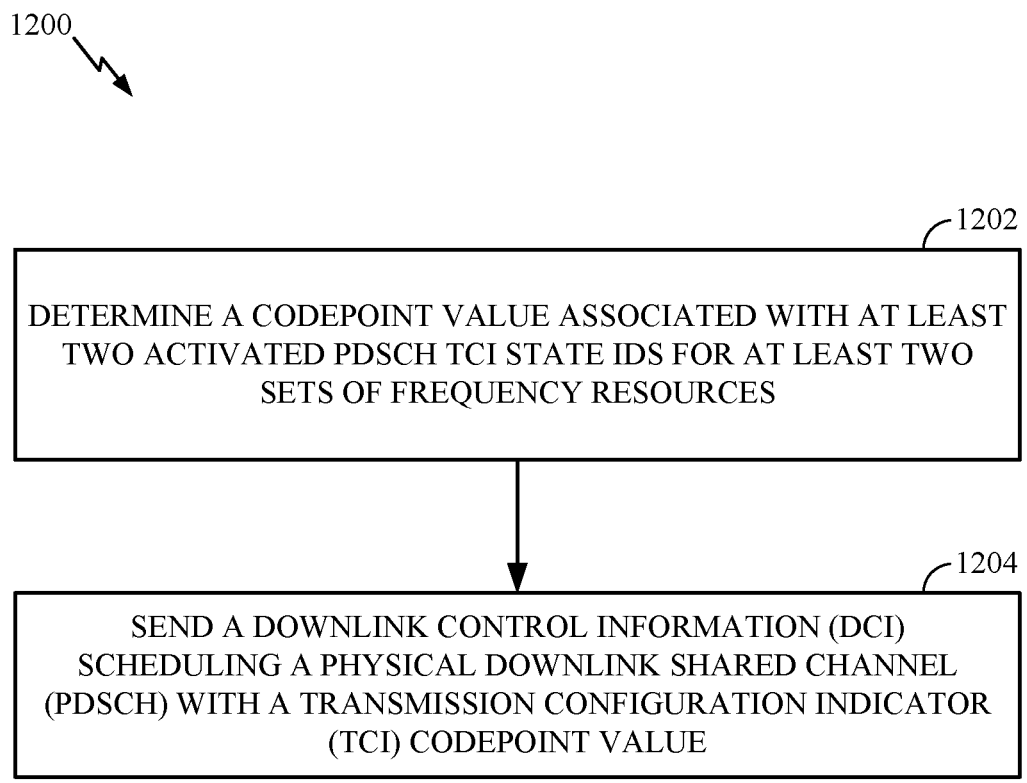
FIG. 12 illustrates example operations for wireless communications by a network entity, in accordance with aspects of the present disclosure.

FIG. 12 illustrates example operations 1200 for wireless communications by a network entity, in accordance with aspects of the present disclosure. For example, operations 1200 may be performed by a base station to communicate with a UE performing operations 1100 described above.

Operations 1200 begin, at 1202, by determining a code point value associated with at least two activated PDSCH TCI state IDs for at least two sets of frequency resources. At 1204, the network entity sends a downlink control information (DCI) scheduling a physical downlink shared channel (PDSCH) with a transmission configuration indicator (TCI) code point value.

In this manner, for single DCI based mTRP on each of multiple CCs, a (single) PDSCH TCI code point value can be mapped to at least two activated PDSCH TCI state IDs by a single MAC CE for a set of CCs/BWPs. In some cases, the DCI includes a single DCI that schedules PDSCHs from multiple transmission reception points.

In some cases, the same mapping between code point values and TCI state IDs may be applied to every BWP/CC in an applicable CC list. The applicable CC list may, for example, be indicated by RRC/MAC-CE/DCI signaling. If multiple CC lists are configured by RRC, the applicable list can be implicitly determined by the indicated CC in the MAC-CE/DCI, or the applicable list can be explicitly signalled via the applicable CC list ID in the MAC-CE/DCI.

Group-CC TCI code point mapping can be done by the same or different MAC-CE as the group-CC TCI state activation MAC-CE. In some cases, the network sends a single MAC CE that activates the PDSCH TCI state IDs.

In some cases, for Group-CC Based PDCCH Beam Updates, when a TCI-state ID is activated for a CORESET by a MAC CE for a set of CCs/BWPs at least for the same band, where the applicable list of CCs is indicated by RRC signaling, the TCI-state ID is applied for the CORESET(s) with the same CORESET ID for all the BWPs in the indicated CCs. In some cases, inter-band CA for this feature may be supported. In some cases, an indication may be provided of the applicable list of bands for the feature of single MAC-CE to activate the same set of PDCCH TCI state IDs for multiple CCs/BWPs.

For the purpose of simultaneous TCI state activation across multiple CCs/BWPs, up to two lists of CCs can be configured by RRC per UE, and the applied list is determined by the indicated CC in the MAC CE. A UE may expect no overlapped CC in multiple RRC-configured lists of CCs.

In some cases, the at least two sets of frequency resources may include at least one of multiple component carriers (CCs) or multiple bandwidth parts (BWPs). For example, the network determines the code point value based on a mapping of the code point value to TCI state IDs. The network may further send signaling indicating a list of CCs and the same mapping is applied to all CCs in the list and corresponding BWPs. The list of CCs may be indicated via at least one of RRC signaling, MAC CE, or DCI. In some cases, multiple CC lists are configured via RRC signaling. The network entity determines an applicable list implicitly by an indicated CC in a MAC CE or DCI, or explicitly by signaling via an applicable CC list ID in the MAC CE or DCI. The network entity may further send signaling indicating the mapping via a MAC CE that activates the PDSCH TCI state IDs or a separate MAC CE.

Figure 13:
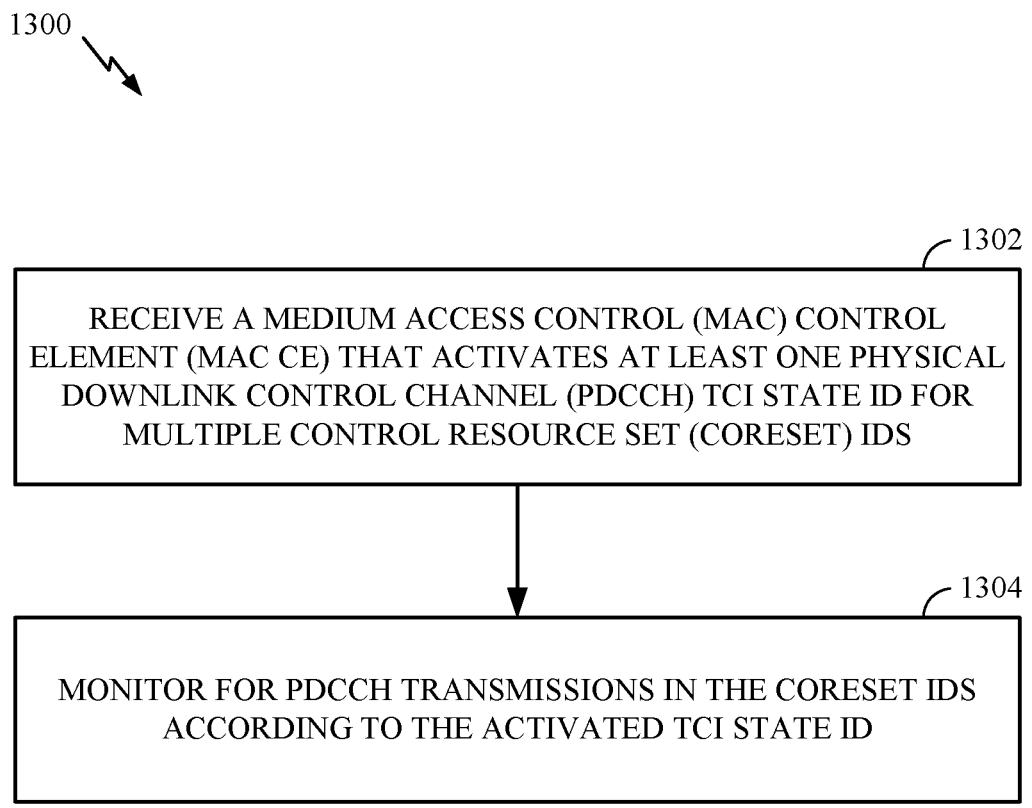
FIG. 13 illustrates example operations for wireless communications by a user equipment (UE), in accordance with aspects of the present disclosure.

FIG. 13 illustrates example operations 1300 for wireless communications by a UE, in accordance with aspects of the present disclosure.

Operations 1300 begin, at 1302, by receiving a medium access control (MAC) control element (MAC CE) that activates at least one physical downlink control channel (PDCCH) TCI state ID for multiple control resource set (CORESET) IDs. At 1304, the UE monitors for PDCCH transmissions in the CORESET IDs according to the activated TCI state ID.

In some cases, the UE receives a single DCI that schedules PDSCHs from multiple transmission reception points. In some cases, at least one activated TCI state ID is applied to CORESETs in one or more configured downlink BWPs of one or more component carriers (CCs) in a CC list.

In some cases, the multiple CORESET IDs are members of a group having a CORESET group ID. The MAC CE indicates the CORESET group ID with a set of activated TCI state IDs applied to CORESETs in the CORESET group. The CORESET group may include CORESETs with different higher layer transmitter receiver point (TRP) indexes. The UE may receive signaling configuring the CORESET IDs of the CORESET group. In some cases, the UE may determine the CORESET IDs of the CORESET group based on a rule. For example, the rule may group CORESETs with certain IDS for different TRP indexes into a first group. The rule may group CORESETs with certain IDs for the different TRP indexes into a second group.

In some cases, the set of activated TCI state IDs per CORESET group may be indicated by at least one of individual TCI state IDs or ae TCI state group ID. The TCI state group ID may be mapped to individual TCI state IDs. The CORESET group may include CORESETs with different higher layer transmitter receiver point (TRP) indexes. The network entity may send signaling configuring the CORESET IDs of the CORESET group or determines the CORESET IDs of the CORESET group based on a rule, which may group CORESETs with certain IDs for different TRP indexes into a first group and group CORESETs with certain IDs for the different TRP indexes into a second group.

In some cases, different CORESET IDs are configured for at least some component carriers (CC)s included in a CC list. A rule may dictate that all CCs must have the same configured CORESET IDs to be included in the same CC list.

In some cases, the UE is configured to ignore a MAC CE for group-CC PDCCH TCI state activation for CORESET IDs that are not configured in a CC. The TCI state IDs may be configured per CORESET ID per CC for CCs included in the CC list. A rule may dictate that TCI state IDs should be the same per CORESET ID for all CCs in the CC list.

In some cases, the UE is configured to ignore a MAC CE for group-CC PDCCH TCI state activation for a TCI state ID not configured in a CC for an indicated CORESET ID.

Figure 14:
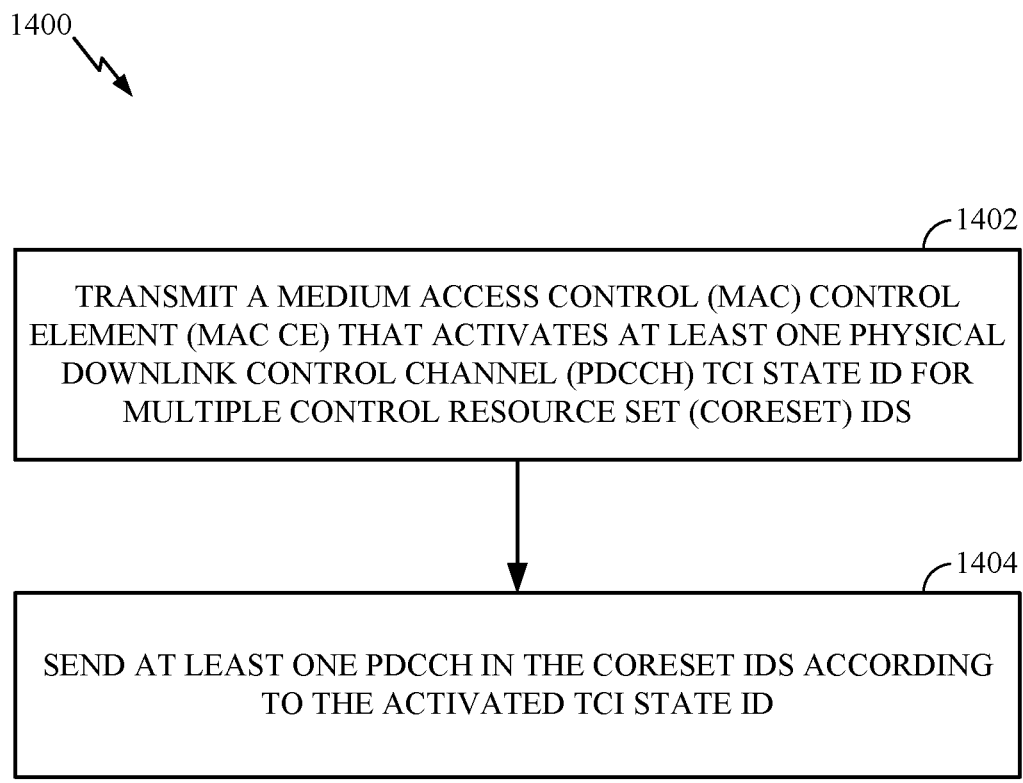
FIG. 14 illustrates example operations for wireless communications by a network entity, in accordance with aspects of the present disclosure.

FIG. 14 illustrates example operations 1400 for wireless communications by a network entity, in accordance with aspects of the present disclosure. For example, operations 1400 may be performed by a base station to communicate with a UE performing operations 1300 described above.

Operations 1400 begin, at 1402, by transmitting a medium access control (MAC) control element (MAC CE) that activates at least one physical downlink control channel (PDCCH) TCI state ID for multiple control resource set (CORESET) IDs. At 1404, the network entity sends at least one PDCCH in the CORESET IDs according to the activated TCI state ID.

In this manner, for a group-CC PDCCH TCI state activation MAC-CE, TCI states for multiple CORESET IDs may be activated. In some cases, the activated TCI state ID for a given CORESET ID may be applied to all BWPs/CCs in a CC list. The multiple CORESET IDs may be configured per CC for CCs included in the CC list. In some cases, a rule may dictate that all CCs must have the same configured CORESET IDs to be included in the same CC list.

In some cases, the network entity sends a downlink control information (DCI) scheduling a physical downlink shared channel (PDSCH) with a transmission configuration indicator (TCI) code point value. The DCI may include a single DCI that schedules PDSCHs from multiple transmission reception points.

In some cases, instead of individual CORESET IDs, the group-CC PDCCH TCI state activation MAC-CE can indicate a CORESET group ID with a set of activated TCI state IDs applied to CORESETs in the CORESET group. In such cases, the CORESET group may contain CORESETs with different higher layer TRP indexes.

The set of CORESET IDs per CORESET group can be explicitly configured, or implicitly determined by a rule. For example, a rule may dictate that the two CORESETs with lowest ID for higher layer TRP index 0 and 1 respectively form a first group, while the two CORESETs with second lowest ID for higher layer TRP index 0 and 1 respectively form a second group, and so on, depending on the number of groups.

In some cases, the set of activated TCI state IDs per CORESET group can be indicated by individual TCI state IDs. In other cases, the set of active TCI state IDs may be indicated by a TCI state group ID, which is mapped to individual TCI state IDs. In some cases, at least one activated TCI state ID is applied to CORESETs in one or more configured downlink bandwidth parts (BWPs) of one or more component carrier (CCs) in a CC list. CORESET IDs may be configured per CC for CCs included in a CC list, according to various options. For example, according to a first option, all CCs may be required to have same configured CORESET IDs to be included in the same CC list. According to a second option, all CCs may be allowed to have different configured CORESET IDs. In this case, for group-CC PDCCH TCI state activation MAC-CE, the UE may ignore indicated CORESET IDs that are not configured in a CC.

In some cases, TCI state IDs may be configured per CORESET ID per CC for CCs included in a CC list, according to various options. For example, for a first option, configured TCI state IDs may be required to be the same per CORESET ID for all CCs in a CC list. For a second option, configured TCI state IDs may be allowed to be different per CORESET ID for all CCs in a CC list. In this case, for group-CC PDCCH TCI state activation MAC-CE, the UE may ignore activated TCI state IDs that are not configured in a CC for the indicated CORESET ID.

Example Aspects

Aspect 1: A method for wireless communications performed by a user equipment (UE), comprising receiving a downlink control information (DCI) scheduling a physical downlink shared channel (PDSCH) with a transmission configuration indicator (TCI) code point value; determining, based on the code point value, at least two activated PDSCH TCI state IDs for at least two sets of frequency resources; and processing the PDSCH according to the indicated TCI state IDs.

Aspect 2: The method of Aspect 1, wherein the DCI comprises single DCI that schedules PDSCHs from multiple transmission reception points.

Aspect 3: The method of Aspects 1 or 2, further comprising receiving a single medium access control (MAC) control element (MAC CE) that activates the PDSCH TCI state IDs.

Aspect 4: The method of any of Aspects 1-3, wherein the multiple sets of frequency resources comprise at least one of: multiple component carriers (CCs); or multiple bandwidth parts (BWPs).

Aspect 5: The method of any of Aspects 1-4, wherein the determination is based on a mapping of the code point value to TCI state IDs.

Aspect 6: The method of any of Aspects 1-5, further comprising receiving signaling indicating a list of CCs and the same mapping is applied to all CCs in the list and corresponding BWPs.

Aspect 7: The method of any of Aspects 1-4, further comprising receiving signaling indicating the mapping via: a medium access control (MAC) control element (MAC CE) that activates the PDSCH TCI state IDs; or a separate MAC CE.

Aspect 8: A method for wireless communications performed by a network entity, comprising: determining a code point value associated with at least two activated PDSCH TCI state IDs for at least two sets of frequency resources; and sending a downlink control information (DCI) scheduling a physical downlink shared channel (PDSCH) with a transmission configuration indicator (TCI) code point value.

Aspect 9: The method of Aspect 8, wherein the DCI comprises single DCI that schedules PDSCHs from multiple transmission reception points.

Aspect 10: The method of Aspects 8 or 9, further comprising sending a single medium access control (MAC) control element (MAC CE) that activates the PDSCH TCI state IDs.

Aspect 11: The method of any of Aspects 8-10, wherein the multiple sets of frequency resources comprise at least one of: multiple component carriers (CCs); or multiple bandwidth parts (BWPs).

Aspect 12: The method of any of Aspects 8-11, wherein the determination is based on a mapping of the code point value to TCI state IDs.

Aspect 13: The method of any of Aspects 8-12, further comprising sending signaling indicating a list of CCs and the same mapping is applied to all CCs in the list and corresponding BWPs.

Aspect 14: The method of any of Aspects 8-13, further comprising sending signaling indicating the mapping via a medium access control (MAC) control element (MAC CE) that activates the PDSCH TCI state IDs; or a separate MAC CE.

Aspect 15: A method for wireless communications performed by a user equipment (UE), comprising: receiving a medium access control (MAC) control element (MAC CE) that activates at least one physical downlink control channel (PDCCH) TCI state ID for multiple control resource set (CORESET) IDs; and monitoring for PDCCH transmissions in the CORESET IDs according to the activated TCI state ID.

Aspect 16: The method of Aspect 15, further comprising receiving a single DCI that schedules PDSCHs from multiple transmission reception points.

Aspect 17: The method of Aspects 15 or 16, wherein at least one activated TCI state ID is applied to CORESETs in one or more configured downlink BWPs of one or more component carrier (CCs) in a CC list.

Aspect 18: The method of any of Aspects 15-17, wherein the multiple CORESET IDs are member of a group having a CORESET group ID; and the MAC CE indicates the CORESET group ID with a set of activated TCI state IDs applied to CORESETs in the CORESET group.

Aspect 19: The method of any of Aspects 15-18, wherein the set of activated TCI state IDs per CORESET group is indicated by at least one of: individual TCI state IDs; or a TCI state group ID, which is mapped to individual TCI state IDs.

Aspect 20: The method of any of Aspects 15-19, wherein different CORESET IDs are configured for at least some component carriers (CCs) included in a CC list.

Aspect 21: The method of any of Aspects 15-20, wherein the UE is configured to ignore a MAC CE for group-CC PDCCH TCI state activation for CORESET IDs that are not configured in a CC.

Aspect 22: The method of any of Aspects 15-21, wherein the TCI state IDs are configured per CORESET ID per CC for CCs included in a CC list.

Aspect 23: The method of any of Aspects 15-22, wherein the UE is configured to ignore a MAC CE for group-CC PDCCH TCI state activation for a TCI state ID not configured in a CC for an indicated CORESET ID.

Aspect 24: A method for wireless communications performed by a network entity, comprising transmitting a medium access control (MAC) control element (MAC CE) that activates at least one physical downlink control channel (PDCCH) TCI state ID for multiple control resource set (CORESET) IDs; and sending at least one PDCCH in the CORESET IDs according to the activated TCI state ID.

Aspect 25: The method of Aspect 24, wherein the DCI comprises single DCI that schedules PDSCHs from multiple transmission reception points.

Aspect 26: The method of Aspects 24 or 25, wherein at least one activated TCI state ID is applied to CORESETs in one or more configured downlink bandwidth parts (BWPs) of one or more component carrier (CCs) in a CC list.

Aspect 27: The method of any of Aspects 24-26, wherein the multiple CORESET IDs are member of a group having a CORESET group ID; and the MAC CE indicates the CORESET group ID with a set of activated TCI state IDs applied to CORESETs in the CORESET group.

Aspect 28: The method of any of Aspects 24-27, wherein the set of activated TCI state IDs per CORESET group is indicated by at least one of individual TCI state IDs; or a TCI state group ID, which is mapped to individual TCI state IDs.

Aspect 29: The method of any of Aspects 24-28, wherein the multiple CORESET IDs are configured per component carrier (CC) for CCs included in a CC list.

Aspect 30: The method of any of Aspects 24-29, wherein the TCI state IDs are configured per CORESET ID per CC for CCs included in a CC list.

Aspect 31: An apparatus with at least one processor and a memory configured to perform operations of any of Aspects 1-7.

Aspect 32: An apparatus with at least one processor and a memory configured to perform operations of any of Aspects 8-14.

Aspect 33: An apparatus with at least one processor and memory configured to perform operations of any of Aspects 15-23.

Aspect 34: An apparatus with at least one processor and memory configured to perform operations of any of Aspects 24-30.

Aspect 35: An apparatus with means for performing operations of any of Aspects 1-7.

Aspect 36: An apparatus with means for performing operations of any of Aspects 8-14.

Aspect 37: An apparatus with means for performing operations of any of Aspects 15-23.

Aspect 38: An apparatus with means for performing operations of any of Aspects 24-30.

Aspect 39: A computer readable medium having instructions stored thereon for performing operations of any of Aspects 1-7.

Aspect 40: A computer readable medium having instructions stored thereon for performing operations of any of Aspects 8-14.

Aspect 41: A computer readable medium having instructions stored thereon for performing operations of any of Aspects 15-23.

Aspect 42: A computer readable medium having instructions stored thereon for performing operations of any of Aspects 24-30.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, operations 1100, 1200, 1300, and 1400 of FIGS. 11, 12, 13 and 14 may be performed by various processors shown in FIG. 4. Generally, where there are operations illustrated in figures, those operations may have corresponding counterpart means-plus-function.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). The phrase computer readable medium does not refer to a transitory propagating signal. In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising:
receiving a single medium access control (MAC) control element (CE) that activates a plurality of physical downlink shared channel (PDSCH) transmission configuration indicator (TCI) state identifiers (IDs);
receiving a single downlink control information (DCI) scheduling a PDSCH transmission for a frequency resource in a first set of frequency resources, wherein the DCI comprises a single TCI code point value;
determining, based on the TCI code point value, at least two activated PDSCH TCI state IDs of the plurality of activated PDSCH TCI state IDs, wherein:
a first activated PDSCH TCI state ID of the at least two activated PDSCH TCI state IDs is associated with the first set of frequency resources, and
a second activated PDSCH TCI state ID of the at least two activated PDSCH TCI state IDs is associated with a second set of frequency resources, different from the first set of frequency resources; and
processing the PDSCH transmission according to the first activated PDSCH TCI state ID.

2. The method of claim 1, wherein the DCI schedules PDSCH transmissions from multiple transmission reception points.

3. The method of claim 1, wherein the first set of frequency resources and the second set of frequency resources each comprises at least one of:
multiple component carriers (CCs); or
multiple bandwidth parts (BWPs).

4. The method of claim 3, wherein:
the determination is based on a mapping of the TCI code point value to TCI state IDs.

5. The method of claim 4, further comprising receiving signaling indicating a list of CCs in the first set of frequency resources, wherein the same mapping is applied to all CCs in the list and corresponding BWPs.

6. The method of claim 4, further comprising receiving signaling indicating the mapping via:
the MAC CE that activates the plurality of PDSCH TCI state IDs; or
a separate MAC CE.

7. A method for wireless communications performed by a network entity, comprising:
sending a single medium access control (MAC) control element (CE) that activates a plurality of physical downlink shared channel (PDSCH) transmission configuration indicator (TCI) state identifiers (IDs);
determining a TCI code point value associated with at least two activated PDSCH TCI state IDs of the plurality of activated PDSCH TCI state IDs, wherein:
a first activated PDSCH TCI state ID of the at least two activated PDSCH TCI state IDs is associated with a first set of frequency resources, and
a second activated PDSCH TCI state ID of the at least two activated PDSCH TCI state IDs is associated with a second set of frequency resources, different from the first set of frequency resources; and
sending a single downlink control information (DCI) scheduling a PDSCH transmission for a frequency resource in the first set of frequency resources, wherein the DCI comprises the TCI code point value.

8. The method of claim 7, wherein the DCI schedules PDSCH transmissions from multiple transmission reception points.

9. The method of claim 7, wherein the first set of frequency resources and the second set of frequency resources each comprises at least one of:
multiple component carriers (CCs); or
multiple bandwidth parts (BWPs).

10. The method of claim 9, wherein:
the determination is based on a mapping of the TCI code point value to TCI state IDs.

11. The method of claim 10, further comprising sending signaling indicating a list of CCs in the first set of frequency resources, wherein the same mapping is applied to all CCs in the list and corresponding BWPs.

12. The method of claim 10, further comprising sending signaling indicating the mapping via:
the MAC CE that activates the plurality of PDSCH TCI state IDs; or
a separate MAC CE.

13. A method for wireless communications performed by a user equipment (UE), comprising:
receiving a medium access control (MAC) control element (CE) that activates at least one physical downlink control channel (PDCCH) transmission configuration indicator (TCI) state identifier (ID) for multiple control resource set (CORESET) IDs; and
monitoring for PDCCH transmissions in CORESETs associated with the multiple CORESET IDs according to the at least one activated PDCCH TCI state ID.

14. The method of claim 13, further comprising receiving a single downlink control information (DCI) that schedules physical downlink shared channel (PDSCH) transmissions from multiple transmission reception points.

15. The method of claim 13, wherein the at least one activated PDCCH TCI state ID is applied to the CORESETs in one or more configured downlink bandwidth parts (BWPs) of one or more component carriers (CCs) in a CC list.

16. The method of claim 13, wherein:
the multiple CORESET IDs are members of a CORESET group having a CORESET group ID; and
the MAC CE indicates the CORESET group ID with a set of PDCCH TCI state IDs including the at least one PDCCH TCI state ID applied to CORESETs associated with the corset IDs in the CORESET group.

17. The method of claim 16, wherein the set of TCI state IDs is indicated by at least one of:
individual PDCCH TCI state IDs of the set of PDCCH TCI state IDs; or
a TCI state group ID, wherein the TCI state group ID is mapped to the individual PDCCH TCI state IDs.

18. The method of claim 13, wherein:
different CORESET IDs are configured for at least some component carriers (CCs) included in a CC list.

19. The method of claim 18, further comprising ignoring a MAC CE for group-CC PDCCH TCI state activation for a CORESET ID that is not configured in a CC.

20. The method of claim 13, wherein:
PDCCH TCI state IDs are configured per CORESET ID per component carrier (CC) for CCs included in a CC list.

21. The method of claim 20, further comprising ignoring a MAC CE for group-CC PDCCH TCI state activation for a PDCCH TCI state ID that is not configured in a CC for an indicated CORESET ID.

22. A method for wireless communications performed by a network entity, comprising:
sending a medium access control (MAC) control element (CE) that activates at least one physical downlink control channel (PDCCH) transmission configuration indicator (TCI) state identifier (ID) for multiple control resource set (CORESET) IDs; and
sending at least one PDCCH transmission in at least one CORESET associated with the multiple CORESET IDs according to the at least one activated PDCCH TCI state ID.

23. The method of claim 22, further comprising sending a single downlink control information (DCI) scheduling multiple physical downlink shared channel (PDSCH) transmissions from multiple transmission reception points, wherein the DCI includes a (TCI) code point value.

24. The method of claim 22, wherein the at least one activated TCI state ID is applied to CORESETs associated with the multiple CORESET IDs in one or more configured downlink bandwidth parts (BWPs) of one or more component carrier (CCs) in a CC list.

25. The method of claim 22, wherein:
the multiple CORESET IDs are members of a CORESET group having a CORESET group ID; and
the MAC CE indicates the CORESET group ID with a set of PDCCH TCI state IDs including the at least one PDCCH TCI state ID applied to CORESETs associated with the CORSET IDs in the CORESET group.

26. The method of claim 25, wherein the set of TCI state IDs is indicated by at least one of:
individual PDCCH TCI state IDs of the set of PDCCH TCI state IDs; or
a TCI state group ID, wherein the TCI state group ID is mapped to the individual PDCCH TCI state IDs.

27. The method of claim 22, wherein:
the multiple CORESET IDs are configured per component carrier (CC) for CCs included in a CC list.

28. The method of claim 22, wherein:
TCI state IDs are configured per CORESET ID per component carrier (CC) for CCs included in a CC list.

29. A user equipment (UE), comprising:
a memory storing computer-executable code thereon;
at least one processor configured to execute the computer-executable code and cause the UE to:
receive a single medium access control (MAC) control element (CE) that activates a plurality of physical downlink shared channel (PDSCH) transmission configuration indicator (TCI) state identifiers (IDs);
receive a single downlink control information (DCI) scheduling a PDSCH transmission for a frequency resource in a first set of frequency resources, wherein the DCI comprises a single TCI code point value;
determine, based on the TCI code point value, at least two activated PDSCH TCI state IDs of the plurality of activated PDSCH TCI state IDs, wherein:
a first activated PDSCH TCI state ID of the at least two activated PDSCH TCI state IDs is associated with the first set of frequency resources, and
a second activated PDSCH TCI state ID of the at least two activated PDSCH TCI state IDs is associated with a second set of frequency resources, different from the first set of frequency resources; and
process the PDSCH according to the first activated PDSCH TCI state ID.

30. The user equipment of claim 29, wherein the DCI schedules PDSCH transmissions from multiple transmission reception points.

* * * * *